United States Patent [19]

Miyauchi

[11] Patent Number: 4,830,216
[45] Date of Patent: May 16, 1989

[54] LID FOR PRESSURE-HEAT COOKING VESSEL

[75] Inventor: Keinosuke Miyauchi, Tokyo, Japan

[73] Assignee: Yugen Gaisha Miyakei Company, Tokyo, Japan

[21] Appl. No.: 214,012

[22] Filed: Jun. 30, 1988

[30] Foreign Application Priority Data

Jul. 8, 1987 [JP] Japan ............................. 62-104948
Jul. 28, 1987 [JP] Japan ............................. 62-115346
Sep. 14, 1987 [JP] Japan ............................. 62-140477
Oct. 3, 1987 [JP] Japan ............................. 62-152118
Dec. 15, 1987 [JP] Japan ............................. 62-190306
Dec. 29, 1987 [JP] Japan ............................. 62-335595

[51] Int. Cl.⁴ .............................................. B65D 51/00
[52] U.S. Cl. .................................. 220/377; 220/82 R
[58] Field of Search .............................. 220/82 R, 377

[56] References Cited

U.S. PATENT DOCUMENTS 3,438,539 4/1969 LeRoy .................................. 220/377
4,335,825 6/1982 Sakazume ........................ 220/82 R Primary Examiner—George T. Hall
Attorney, Agent, or Firm—James E. Nilles

[57] ABSTRACT

A lid for a pressure-heat cooking vessel, which is adapted to close or open an opening of the vessel in which food to be cooked is contained, wherein a transparent glass block is mounted in an opening formed in a lid body and held by a retainer to hermetically close the opening. The glass block is projected outside of the lid body.

11 Claims, 6 Drawing Sheets

F I G. 11
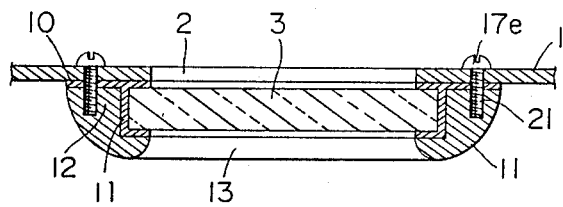
F I G. 12
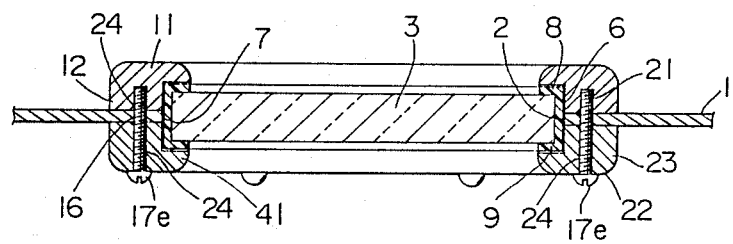
F I G. 13
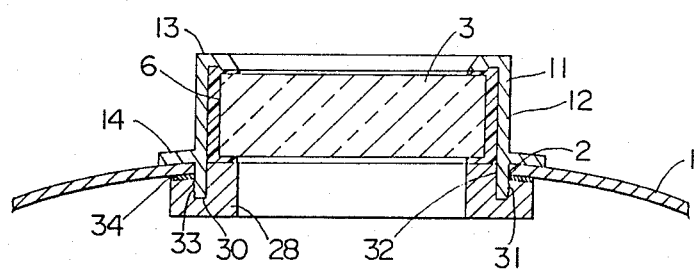

LID FOR PRESSURE-HEAT COOKING VESSEL

BACKGROUND OF THE INVENTION

1. Field of the Invention

The present invention relates to a lid for pressure-heat cooking vessels such as pressure cookers.

2. Description of the Prior Art

Conventional pressure-heat cooking vessels such as pressure cookers have their lids formed of metal with a specified thickness to give a certain level of pressure resistance. The pressure-heat cooking vessel lids are mainly of two types when classified according to the process of forming: one type is formed by pressing rolled metal plates such as aluminum plates, stainless steel plates and enameled steel plates, and the other type is formed by die-casting aluminum alloys.

During cooking by pressure and heat the lid of the cooking vessel must hermetically seal he interior of the vessel from the outside and thus cannot be opened to visually check the state of the food inside. Also since the conventional lid as well as the vessel body is formed of metal, which is opaque, the food being cooked cannot be seen from outside with the lid closed.

SUMMARY OF THE INVENTION

An object of this invention is to solve the above-mentioned problem and to provide a lid for the pressure-heat cooking vessel that allow one to visually check the state of food being cooked.

The lid for the pressure-heat cooking vessel of this invention, which is adapted to close or open an opening of the vessel in which food to be cooked is contained, consists of a transparent glass block that is mounted in an opening formed in the lid and held by a retainer with a packing interposed between the retainer and the glass block to hermetically close the opening.

The lid of another embodiment has a plurality of openings formed therein which are hermetically closed by transparent glass blocks.

In another embodiment, the glass block is protected outside of the lid.

In another embodiment, the glass block in the lid consists of laminated reinforced glass plates bonded together with adhesive layers. The adhesive layers are made of transparent, ultraviolet ray-setting polybutadiene synthetic rubber bonding agent and their outer circumferences are covered with an annular sealing film of heat-resistant silicone resin that spreads over the upper and lower reinforced glass plates' circumferences. The outside of the sealing film is enclosed by the cylindrical portion of a packing made of heat-resistant silicone rubber which is fitted over the circumferential surface of the glass block.

In another embodiment, the glass block is installed in the cylindrical portion of a retainer with a packing interposed therebetween with a flange portion of the retainer secured to the lid and with a holding edge at one end of the cylindrical portion holding the periphery of one surface of the block, pressing the glass block against the lid around an opening formed in the lid.

According to an embodiment, where the cylindrical portion of the retainer is made thick, the bottom surface of the cylindrical portion is placed in contact with the lid and fastenings are screwed, through the lid, into bottomed female screw holes cut in the bottom surface of the cylindrical portion to securely fasten the glass block to the lid.

The lid of the other embodiment has its retainer formed integral therewith and projecting therefrom, with a holding edge at an opening end of the retainer holding a glass block in position.

During cooking, the opening of the pressure-heat cooking vessel is closed by the lid but, according to the lid of this invention, it is possible to visually check the condition of the food being cooked inside the vessel through the opening formed in the lid which is closed by the transparent glass block. The glass block is fastened air-tight to the lid by the retainer through a packing to prevent the leakage of high-pressure steam.

In another embodiment, the interior of the cooking vessel can be seen from different directions through a plurality of openings sealed by the transparent glass blocks permitting one to check the condition of the food being cooked in the hermetically enclosed vessel.

In case that the glass block is projected outwardly from the lid, the packing, bonding agent and sealing material can be protected from the influence of high temperatures in the vessel.

Forming the glass block with a plurality of reinforced glass plates bonded together by adhesive layers increases the pressure and temperature resistance.

The bonding agent for the reinforced glass plates is a transparent polybutadiene synthetic rubber which has a good heat resistance and is ultraviolet ray-setting, so that the presence of the bonding agent layers between the glass plates does not reduce the level of transparency of the glass block and that high temperatures do not deteriorate the adhesion characteristic of the bonding agent. Furthermore, the presence of interposing adhesion layers eliminates the interference fringes which would otherwise result from the lamination of reinforced glass plates.

The outer circumferences of the adhesion layers are covered with a sealing film of heat-resistant silicone resin to prevent hot steam from getting into the adhesion layers.

The cylindrical portion of the packing is fitted over the outer circumference of the glass block to enhance the level of air-tightness. The provision of the packing increases the sealing effect of the sealing film that covers the outer circumferences of the adhesive layers. The annular edge portion at each end of the cylindrical portion of the packing also improves the air-tightness of the glass block at the periphery.

The packing is made of a heat-resistant silicone rubber, so that its quality will not be deteriorated by high temperatures during cooking.

The cylindrical portion of the retainer is tightly fitted over the circumferential surface of the glass block through the packing with the flange portion of the retainer screwed to the lid. This structure strongly presses the annular holding edge of the retainer against the glass block through the packing, thus assuring an effective sealing.

Where the cylindrical portion of the retainer is formed thick, the bottomed female screw holes are cut into the cylindrical portion from the bottom surface contacting the lid. Fastenings are screwed into the bottomed female screw holes through the lid. This construction prevents leakage of high-pressure steam through the screw holes.

When the cylindrical portion of the retainer is formed integral with the lid, the air-tightness between the retainer and the lid is complete and the glass block can easily be mounted.

These and other objects and features of this invention will be described by referring to the attached drawings.

BRIEF DESCRIPTION OF THE DRAWINGS

FIGS. 7 through 16 are vertical front cross-sectional views showing different embodiments of the lid;

DESCRIPTION OF THE PREFERRED EMBODIMENTS

Figure 1:
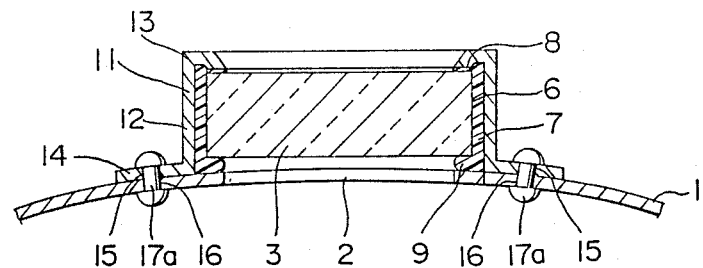
FIG. 1 is a partial vertical front cross-sectional view of a lid as one embodiment of this invention.

An embodiment of a lid for the pressure-heat cooking vessel of this invention will be described in the following by referring to FIGS. 1 to 6.

Reference numeral 1 represents the lid that opens or closes an opening at the top of a pressure-heat cooking vessel (not shown) and that hermetically seals it under pressure. In the figures, an area below the lid is the interior of the vessel and an area above it is the exterior of the vessel, or on the open air side. The lid 1 is formed by pressing metal plates such as aluminum and stainless steel plates or by die-casting aluminum alloys. The lid 1 has an opening 2 formed at one location thereof.

Figure 3:
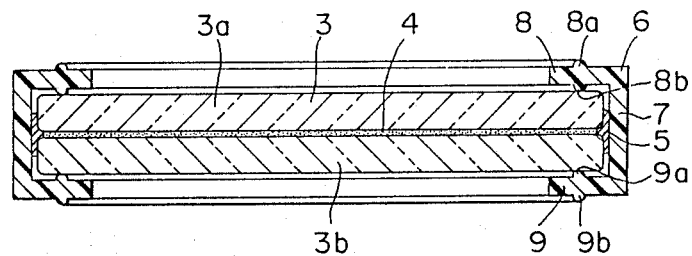
Figure 4:
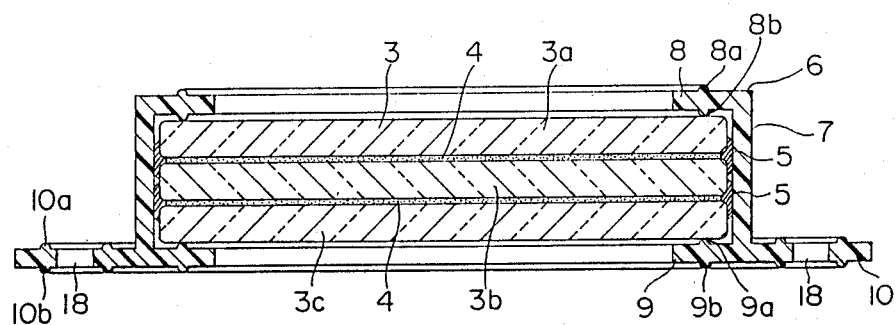

Designated 3 is a transparent glass block which has heat and pressure resistances high enough to hermetically close the opening 2. The glass block 3 is formed of a reinforced single glass disk with high pressure and high temperature resistances whose thickness is determined on the basis of pressure resistance calculation. Or the glass block 3 is formed of a laminated material consisting of either two reinforced glass plates 3a, 3b (one of them may be a heat resistant glass plate) bonded together by an adhesive layer 4 as shown in FIG. 3, or three reinforced glass plates 3a, 3b, 3c (one of them may be a heat resistant glass plate) bonded together by the adhesive layers 4 as shown in FIG. 4. The thickness of each reinforced glass plate 3a, 3b, 3c is determined by the pressure resistance calculation. The use of the heat resistant glass plate in the laminated glass plates prevents the reinforced glass plates, when broken, from dispersing in pieces. The bonding agent used for the adhesive layer 4 is a transparent, heat-resistant, ultraviolet ray-setting polybutadiene synthetic rubber bonding agent. The heat-resistant, ultraviolet ray-setting polybutadiene synthetic rubber bonding agent hardens when it is radiated with ultraviolet rays with air sealed off. This bonding agent hardens in a short time, has a good sealing characteristic and a good heat resistance, does not discolor with elapse of time, contains no air holes, and has a high resistance against rapid cooling. Where the glass block 3 is formed of laminated, reinforced glass plates in particular, the presence of the adhesive layer between the glass plates maintains a good transparency of the glass block 3, which would otherwise be impaired by interference fringes caused by laminated reinforced glass plates.

For the glass block 3 which consists of two or three glass plates laminated and bonded together by the adhesive layers 4, a transparent water-repellent sealing film 5 of silicone resin with heat and chemical resistances is applied to the outer circumferences of the adhesive layers 4 in such a way as to cover the circumferences of the adjacent reinforced glass plates 3a, 3b, 3c in order to seal the circumferences of the adhesive layers and thereby prevent hot steam from getting into the adhesive layers 4.

Denoted 6 is a packing of heat-resistant silicone rubber which consists of a cylindrical portion 7 tightly fitted over the circumferential surface of the glass block 3 and annular edge portions 8, 9 formed integral with the inner circumferences at the upper and lower ends of the cylindrical portion 7 and tightly fitted over the edges of the upper and lower surfaces of the glass block 3. The annular edge portions 8, 9 have small ring projections 8a, 8b, 9a, 9b at the top and the underside to improve the sealing effect.

Figure 2:
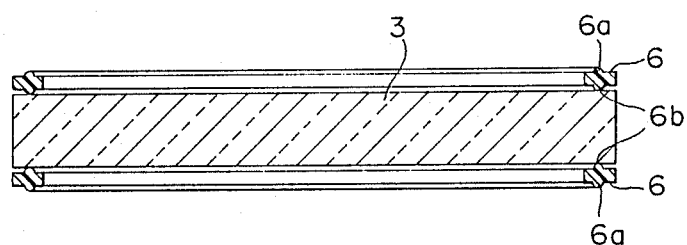
FIGS. 2, 3 and 4 are vertical front cross-sectional views of glass blocks with packings mounted, representing three different embodiments of the glass block.

For the glass block 3 formed of a single reinforced glass plate, the packing 6 may be formed into rings that engage the circumferential edges of the upper and lower surfaces of the glass block 3, as shown in FIG. 2. In this case, each of the packings 6 is formed with small ring projections 6a, 6b at the upper and lower surfaces.

The packing 6 may also be formed to have a flange 10 around the outer circumference. The flange 10 has small ring projections 10a, 10b formed at the upper and lower surfaces and also mounting holes 18, as shown in FIG. 4.

Designated 11 is a retainer which is formed by pressing aluminum plates or stainless steel plates or by die-casting aluminum alloys. The retainer 11 consists of: a cylindrical portion 12 fitted over the outer circumferential surface of the glass block 3 through the packing 6; an annular holding edge 13 which is formed at the inner circumference of the upper end of the cylindrical portion 12 and whose inner periphery is bent downwardly to hold the upper surface of the glass block 3 through the annular edge portion 8 of the packing 6; and a flange portion 14 formed around the outer circumference of the lower end of the cylindrical portion 12.

In mounting the glass block 3 into the lid 1, the following steps are taken: The glass block 3 fitted into the cylindrical portion 12 of the retainer 11 through the packing 6 is placed on th upper surface of the lid 1 around the opening 2 through the lower annular edge portion 9 of the packing 6; the flange portion 14 of the retainer 11 is placed on the upper surface of the lid 1; six mounting holes 15 of the flange portion 14 are aligned with mounting holes 16 of the lid 1; and rivets 17a as fastenings are driven into the mounting holes to fasten the retainer 11 to the lid 1. Thus, through the annular edge portions 8, 9, the glass block 3 is tightly pressed against the upper surface of the lid 1 around the opening 2, to hermetically seal the opening 2.

For the glass block 3 formed of laminated glass plates as shown in FIGS. 3 and 4, the sealing film 5 of silicone resin that covers the circumferences of the adhesive layers 4 is pressed against the circumferences of the adjacent reinforced glass plates 3a, 3b, 3c by tightly fitting the cylindrical portion 7 of the packing 6 over the glass block 3, thus preventing the hot steam from getting into the adhesive layers 4.

Figure 5:
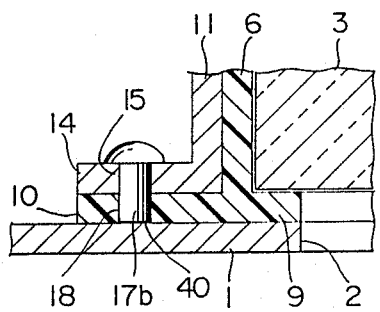
FIGS. 5 and 6 are vertical front cross-sectional views of a fastening and its associated parts, showing two different embodiments of the fastening.

The retainer 11 may also be fixed to the lid 1, as shown in FIG. 5, by spot-welding the rivet shank 17b as a fastening to the upper surface of the lid 1 at 40, sleeving over the projecting rivet shank 17b the flange portion 10 of the packing 6 through the mounting hole 18 and the flange portion 14 of the retainer 11 through the mounting hole 15, and hammering the upper end of the rivet shank 17b into a head. This method does not require mounting holes 16 in the lid 1 and therefore prevents leakage of high-pressure steam from the gap between the holes 16 and the rivet shanks 17b.

Figure 6:
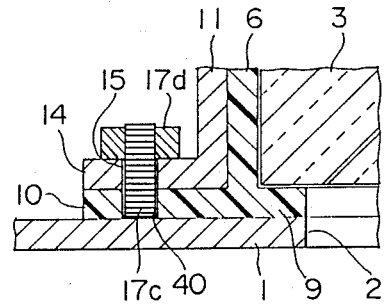

Another method of fastening the retainer 11 to the lid 1 is shown in FIG. 6. This method, like the one shown in FIG. 5, also prevents leakage of high-pressure steam and consists in spot-welding a bolt shank 17c as a fastening to the upper surface of the lid 1 at 40, sleeving over the bolt shank 17c the flange portions 10, 14 through the holes 18, 15, and fastening the nut 17d.

During cooking by heat and pressure, the opening at the top of the cooking vessel is closed air-tightly by the lid 1. The above embodiment allows one to see th food being cooked in the vessel through the opening 2 sealed by the transparent glass block 3 fitted in the lid 1. The glass block 3 projects outwardly from the lid 1 and the area of the glass block exposed to external air is large so that the cooling of the glass block 3 by open air is effectively carried out, keeping the temperatures of the glass block 3 and the packing 6 in a moderate range. For example, the cooking vessel itself will reach the temperature of 120° to 130° C. while the glass block 3 rises only to 90° to 100° C. The glass block 3 and the packing 6 can therefore be prevented from deterioration or damage due to heat.

Most of the lid 1 is formed of metal and the glass block 3 that hermetically seals a part of the lid is thick and firmly fitted so that the lid has a sufficiently high pressure resistance.

The annular holding edge 13 of the retainer 11 which is pressed against the packing 6 effectively prevents pressure leakage.

Next, other embodiments shown in FIGS. 7 to 16 will be explained.

Figure 7:
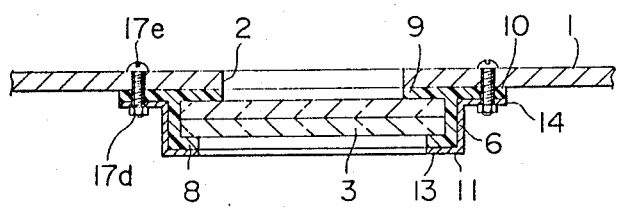

An embodiment shown in FIG. 7 is similar to the lid 1 of FIG. 1 but with the glass block 3 mounted to the underside of the lid at the opening 2. Thus, the flange portions 10, 14 of the packing 6 and the retainer 11 are fastened to the underside of the lid 1 by screws 17e and nuts 17d as fastenings.

With the embodiment of FIG. 7, since the glass block 3 is not projecting from the surface of the lid 1, there is no obstruction on the lid surface, which is advantageous for cooking or for storage. Since it is fastened by the screws 17e and the nuts 17d, the glass block 3 can be replaced.

Figure 8:
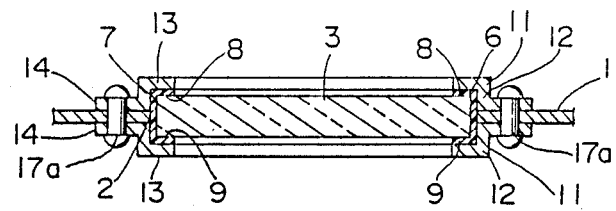

In an embodiment shown in FIG. 8, the glass block 3 fitted with the packing 6 with no flange portions 10 is installed in the opening 2 in the lid 1 in such a manner that it contacts the inner circumference of the opening 2 and projects up and down from the lid 1 to the same thickness. The glass block 3 therefore is fitted into the cylindrical portions 12, 12 of the retainers 11, 11 with the packing 6 interposed, with the annular holding edges 13, 13 engaging the top and bottom of the glass block 3. The flange portions 14, 14 of the retainers 11, 11 clamp between them the lid 1 at the periphery of the opening 2 from above and below and are securely fastened by rivets 17a as fastenings.

With the embodiment of FIG. 8, since the glass block 3 is not deviated to either side, upper or lower side of the lid 1, but projects to the same degree, the effect of high temperatures of steam on the packing 6 can be reduced.

Figure 9:
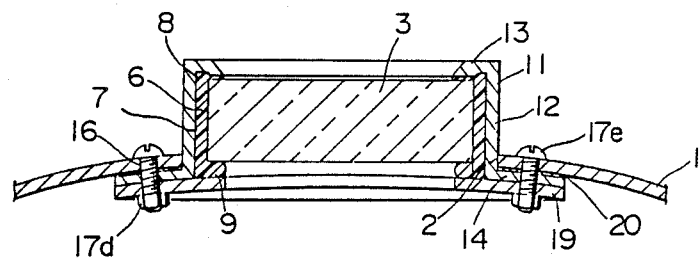

In an embodiment shown in FIG. 9, the glass block 3 attached with the packing 6 and the retainer 11 is fitted from the back of the lid 1 into the opening 2 to project upward from the upper surface of the lid 1. The glass block 3 is supported at its underside by an annular retainer 19 through the lower annular edge portion 9 of the packing 6. The annular retainer 19 is fastened to the underside of the lid 1 at the periphery of the opening 2 through the flange portion 14 of the retainer 11 and an annular packing 20 made of heat-resistant silicone rubber. The lid 1, the annular packing 20, the flange portion 14 and the annular retainer 19 are fastened together by the screws 17e and nuts 17d.

Figure 10:
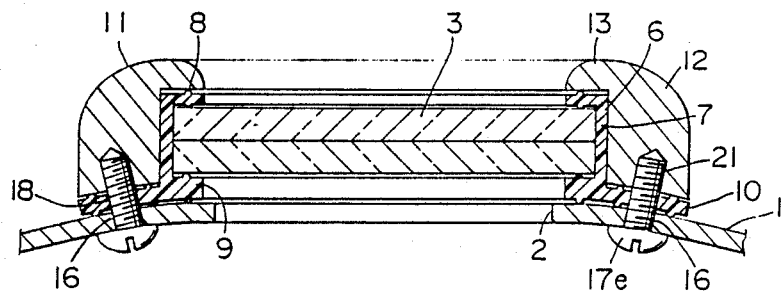

In an embodiment shown in FIG. 10, the cylindrical portion 12 of the retainer 11 holding the glass block 3 on the lid 1 is formed thick. It also has bottomed female screw holes 21 cut from the bottom of the retainer 11 at positions aligned with the mounting hole 16 of the lid 1. The screws 17e as fastenings are screwed from the bottom of the lid 1 into the female screw holes 21 through the flange portion 10 of the packing 6 to securely fasten the glass block 3 to the lid 1.

With the embodiment of FIG. 10, since the screws 17e as fastenings are screwed into the bottomed female screw holes 21, high pressure steam can be prevented from leaking from the gap between the mounting holes 16, 18 of the lid 1 and the flange portion 10 and the screw 17e, thereby enhancing the sealing characteristic of the pressure cooking vessel.

In an embodiment shown in FIG. 11, the retainer 11 has its cylindrical portion 12 formed thick as with the one shown in FIG. 10 and holds from under the lid 1 the glass block 3 which is attached to the underside of the lid 1. The screws 17e as fastenings are screwed, from the upper surface of the lid 1, into the bottomed female screw holes 21 cut in the thick cylindrical portion 12 to press the glass block 3 against the lid around the opening 2. The use of the bottomed female screws 21 prevents leakage of high-pressure steam.

In an embodiment shown in FIG. 12, the glass block 3 attached with a flangeless packing 6 (with no flange portion 10) is fitted into, and contacts the inner circumference of, the opening 2 in the lid 1. The upper part of the glass block 3 projecting upwardly from the opening 2 is engaged, through the flangeless packing 6, with the retainer 11 whose cylindrical portion 12 is thickened. The lower part of the glass block 3 projecting downwardly from the opening 2 is engaged with a thickened cylindrical portion 23 of a lower retainer 22. An annular step 41 formed on the thickened cylindrical portion 23 around the inner circumference supports the lower circumference of the glass block 3 through the lower annular edge portion 9 of the packing 6. The thickened cylindrical portion 23 has axially extending throughholes 24 aligned with the mounting holes 16 in the lid 1. The screws 17e as fastenings inserted into the throughholes 24 from under the thickened cylindrical portion 23 are screwed into the bottomed female screw holes 21 in the retainer 11 through the mounting holes 16 to clamp the retainer 11 and the lower retainer 22 from above and below the lid 1, fastening the glass block 3 to the lid 1.

According to the embodiments shown in FIGS. 10, 11 and 12, the bottomed female screw holes 21 prevent high pressure steam from leaking from around the screws 17e used as fastenings.

FIG. 13 shows still another embodiment of this invention in which the cylindrical portion 12 of the retainer 11 with the opening at the top has the annular holding edge 13 at the top around the inner circumference and the flange portion 14 at the lower part around the outer circumference. The lower part of the cylindrical portion 12 is inserted into, and contacts the inner circumference of, the opening 2 in the lid 1 to form an annular leg 3 projecting into the interior of the lid 1. The annular leg 30 is formed with a female thread portion 31 on the inner or outer circumference at the lower part. The glass block 3 attached with the packing 6 and contained in the retainer 11 is securely fixed by the upper surface of a lower retainer 28 which consists of a cylindrical member screwed over the retainer 11 from the interior of the lid 1. The lower retainer 28 has an annular groove 32 in which the annular leg 30 of the retainer 11 is inserted. The annular groove 32 has a threaded portion 33 at the circumferential wall that engages with the annular leg 30. An annular packing 34 of silicone rubber is interposed between the upper surface of the lower retainer outside of the annular groove 32 and the underside of the lid 1.

Figure 14:
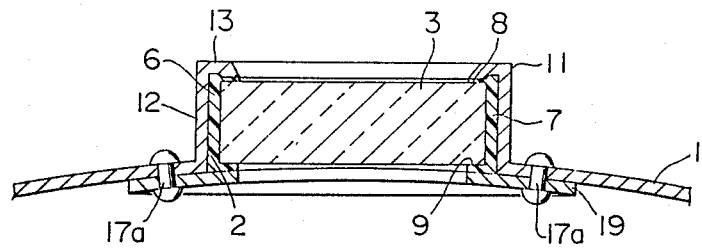

FIG. 14 shows a further embodiment in which the retainer 11 is formed integral with the lid 1 and raised from the opening 2. The cylindrical portion 12 that rises from the opening 2 has the annular holding edge 13 at the upper inner circumference. The glass block 3 tightly fitted in the cylindrical portion 12 of the retainer 11 with the packing 6 interposed therebetween is supported at its bottom, through the lower annular edge 9 of the packing 6, by the inner periphery of the annular retainer 19 which is held to the underside of the lid around the opening 2. The inner periphery of the annular retainer 19 projects inwardly into the opening. The outer periphery of the annular retainer 19 is fixed to the lid 1 by the rivets 17a to securely hold the glass block 3 in position.

According to the embodiment of FIG. 14, the glass block 3 can easily be mounted.

Figure 15:
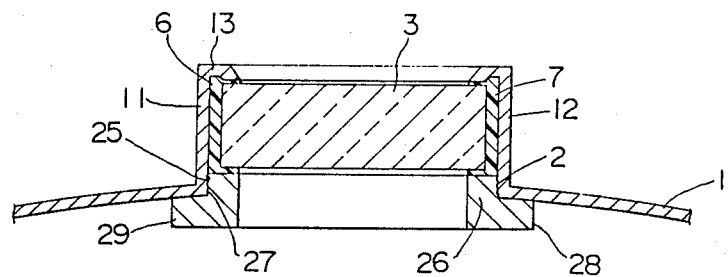

In an embodiment of FIG. 15, the retainer 11 is formed integral with the lid 1 and raised from the opening 2. The height of the cylindrical portion 12 of the retainer 11 is made greater than the thickness of the glass block 3 attached with the packing 6. The cylindrical portion 12 has the annular holding edge 13 formed at the upper inner circumference and a female screw portion 25 formed at the lower inner circumferential surface. The glass block 3 fitted in the retainer 11 through the packing 6 is held against the retainer 11 by the upper surface of a cylindrical portion 26 of the lower retainer 28, the cylindrical portion 26 having a threaded portion 27 at the outer circumference and screwed into the female threaded portion 25. The cylindrical portion 26 has an annular engagement edge 29 at the lower outer circumference to engage with the underside of the lid 1 around the opening 2.

With the embodiment of FIG. 15, the mounting of the glass block 3 is done more easily.

Figure 16:
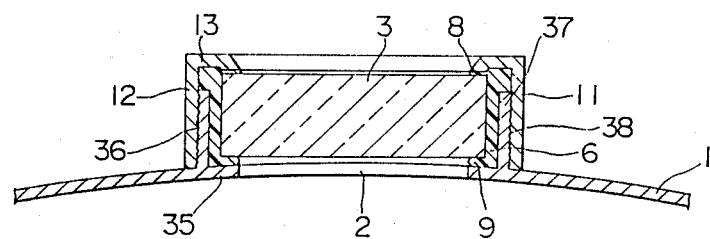

In an embodiment shown in FIG. 16, a cylindrical projecting wall 37 formed integral with the lid 1 is raised from around the periphery 35 of the opening 2. The cylindrical projecting wall 37 has a threaded portion 36 at the outer circumferential surface. The cylindrical projecting wall 37 and the peripheral portion 35 supports the glass block 3 at the circumferential surface and the bottom periphery through the packing 6. The retainer 11 having a female screw portion 38 at the inner circumferential surface and the annular holding edge 13 formed integral therewith at the upper inner circumference is screwed from above over the cylindrical projecting wall 37 to hold the glass block against the upper surface of the peripheral portion 35 of the lid 1 at the opening 2.

According to the embodiment of FIG. 16, since the glass block 3 is installed from outside the lid 1 and held tightly by screwing the retainer 11, replacement of the glass block 3 can easily be done.

In the foregoing we have described the structure for mounting the glass block to the lid by referring to FIG. 1 and FIGS. 7 to 16. Now, we will explain about the position of the opening 2 in the lid 1.

Figure 17:
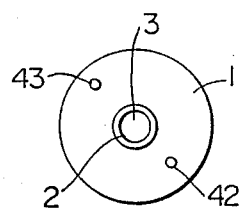
FIGS. 17 to 19 are plan views of the lid with the glass block mounted at different locations.
Figure 18:
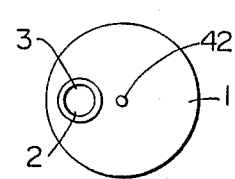

In embodiments shown in FIGS. 17 and 18, the lid 1 is provided with only one opening which is closed by the glass block 3. In the case of FIG. 17, the opening 2 is located at the center of the lid 1 while in FIG. 18 it is located off center on the lid 1. In an embodiment of FIG. 19, the lid 1 is provided with two openings 2. The number of openings 2 formed in the lid 1 may be more than two.

Figure 19:
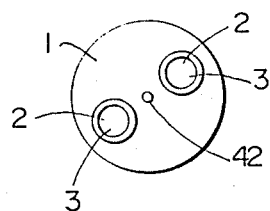

In a lid as shown in FIG. 19, provision of the opening 2 at two or more locations in the lid 1 allows one to see the interior of the cooker from different angles, making the interior checking easy. In this structure, when one looks into the interior of the cooking vessel through one opening 2, light is admitted through another opening 2 providing a clearer view of the food being cooked. This structure also improves the appearance of the lid.

In FIGS. 17 to 19, reference numerals 42 and 43 denote a safety valve and a pressure regulating valve respectively.

Figure 20:
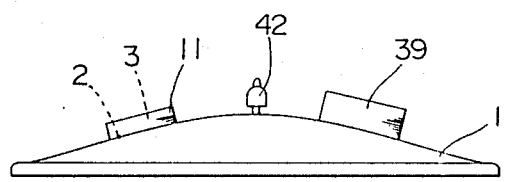
FIG. 20 is a front view of another embodiment of the lid with a lighting box attached.

An embodiment shown in FIG. 20 has a lighting box 39 projecting outwardly from the lid 1 in addition to the opening 2 closed by the glass block 3. The lighting box 39 consists of a light emitting device that illuminates the interior of the cooking vessel, a battery as a source for the light emitting device, and a switch for turning the light emitting device on and off.

This construction enables one to illuminate the interior of the cooking vessel by the lighting box 39 as required in order to clearly see the interior of the vessel, when natural light is not sufficient.

To ensure a clearer view, a wiper may be provided to the glass block 3 to easily remove water droplets forming inside the glass block 3.

It is also possible to provide a temperature sensor to the inside of the lid. This, combined with the visual check through the opening, will contribute to more accurate decision on the condition of the food being cooked.

(Effect of the Invention)

According to this invention, the lid is formed with an opening which is closed by a transparent glass block, so that during pressure-heat cooking it is possible to visually check the condition of the food being cooked in the cooking vessel. Also since the glass block is fastened to the lid by the retainer through packing, the high-pressure steam in the cooking vessel is prevented from leaking from between the lid and the glass block mounting portion—a member separate from the lid.

The lid is also provided with a plurality of openings in which transparent glass blocks are installed, so that one can visually check the cooking condition inside the enclosed pressure-heat cooking vessel through multiple glass blocks at different locations. This makes cooking easier.

Since the glass block is mounted outside the lid, the bonding agent, sealing agent and packing are placed outside the lid and thus are less affected by hot pressurized steam than other parts of the lid. This structure prevents their deterioration.

The glass block which is formed of laminated reinforced glass plates bonded together is robust and has high pressure and heat resistances. As the bonding agent of the adhesive layers, a transparent, heat-resistant, ultraviolet ray-setting polybutadiene synthetic rubber is used. Thus, the glass block is heat-resistant and waterproof and can withstand high-pressure steam. This prevents the clouding of the glass block which might otherwise be caused by hot steam getting between the reinforced glass plates. Also the use of such adhesive layers prevents the interference fringes which would easily result from the lamination of reinforced glass plates.

The outer circumferences of the adhesive layers are covered with a heat-resistant silicone resin sealing film to prevent hot steam from getting into the adhesive layers. Moreover, the outer circumference of the sealing film is further covered with the silicone rubber packing to tightly seal the adhesive layers by the film, ensuring effective protection of the adhesive layers against hot steam. In addition, the packing is interposed between the glass block and the retainer to prevent leakage of hot steam. Because the packing is heat-resistant, its characteristic will not deteriorate maintaining its initial sealing performance.

The retainer contains the glass block in its cylindrical portion through the packing and presses it against the lid to close the opening tightly enough to resist the high-pressure steam.

In the structure where the cylindrical portion of the retainer is made thick, the set screws that fasten the retainer to the lid are screwed into the bottomed female screw holes cut in the thickened cylindrical portion. The use of the bottomed female screw holes prevents leakage of high-pressure steam from the screw holes.

The retainer formed integral with the lid and raised at the opening obviates the need for mounting a separate retainer on the lid and also eliminates the possibility of the high-pressure steam leakage.

What is claimed is:

1. A lid for a pressure-heat cooking vessel, which is adapted to close or open an opening of the vessel in which food to be cooked is contained, comprises an opening formed in a lid body, and a transparent glass block that is mounted in the opening formed in the lid body and held by a retainer with a packing interposed between the retainer and the glass block to hermetically close the opening.

2. A lid for a pressure-heat cooking vessel, which is adapted to close or open an opening of the vessel in which food to be cooked is contained, comprises a plurality of openings formed in the lid body, and transparent glass blocks, each of said transparent glass block being mounted in each of said opening formed in the lid body and held by a retainer with a packing interposed between the retainer and the glass block to hermetically close the opening.

3. The lid according to claim 1 wherein the glass block is projected outside of the lid body.

4. The lid according to claim 1 wherein the glass block consists of laminated reinforced glass plates bonded together with an adhesive layer.

5. The lid according to claim 4 wherein the adhesive layer is made of transparent, ultra-violet ray-setting polybutadiene synthetic rubber bonding agent.

6. The lid according to claim 4 wherein the circumference of the adhesive layer is covered with an annular sealing film of heat-resistant silicone resin that spreads over the upper and lower reinforced glass plates.

7. The lid according to claim 1
wherein said packing consists of a cylindrical portion holding the outer periphery of said glass block, and annular edge portions formed on the inner circumferences at the upper and lower ends of the cylindrical portion and fitted over the upper and lower surfaces of the glass block.

8. The lid according to claim 7 wherein said packing is made of heat-resistant silicone rubber.

9. The lid according to claim 1
wherein retainer comprises a cylindrical portion holding the outer periphery of said glass block through said packing, a holding edge formed at the inner circumference of one end of said cylindrical portion so as to be bent downwardly to hold a surface portion of said glass block through said packing, and a flange portion formed around the outer circumference of the other end of said cylindrical portion to be secured to said lid body.

10. The lid according to claim 1
wherein said retainer comprises a thick cylindrical portion holding the outer periphery of said glass block through said packing, a holding edge formed at the inner circumference of one end of said cylindrical portion to hold a surface portion of said glass block, and bottomed female screw holes cut in the bottom surface at the other end of said cylindrical portion contacting the lid body.

11. The lid according to claim 1
wherein said retainer comprises a cylindrical portion holding the outer periphery of said glass block through said packing, and a holding edge formed at the inner circumference of one end of said cylindrical portion so as to be bent downwardly to hold a surface portion of said glass block.

* * * * *